US012606478B2

(12) United States Patent
Humbertjean et al.

(10) Patent No.: US 12,606,478 B2
(45) Date of Patent: Apr. 21, 2026

(54) BOTTOM FORMING PROCESS

(71) Applicant: SCHOTT Pharma AG & Co. KGaA, Mainz (DE)

(72) Inventors: Alexander Humbertjean, Müllheim (DE); Tobias Wetzel, Müllheim (DE); Fatih Mutlu, Müllheim (DE)

(73) Assignee: SCHOTT Pharma AG & Co. KGaA, Mainz (DE)

(*) Notice: Subject to any disclaimer, the term of this patent is extended or adjusted under 35 U.S.C. 154(b) by 229 days.

(21) Appl. No.: 18/348,093

(22) Filed: Jul. 6, 2023

(65) Prior Publication Data

US 2024/0010543 A1 Jan. 11, 2024

(30) Foreign Application Priority Data

Jul. 8, 2022 (EP) ..................................... 22183916

(51) Int. Cl.
*C03B 23/09* (2006.01)

(52) U.S. Cl.
CPC ................................... *C03B 23/09* (2013.01)

(58) Field of Classification Search
None
See application file for complete search history.

(56) References Cited

U.S. PATENT DOCUMENTS 3,215,517 A 11/1965 Zimmermann
3,222,157 A 12/1965 Dichter 6,557,379 B1 * 5/2003 Nagasawa ........... C03B 23/0496
65/109
7,415,843 B2 * 8/2008 Yoneda ................... C03B 11/08
65/102
11,014,701 B2 5/2021 Langsdorf et al.
11,806,716 B2 11/2023 Frost et al.
2004/0025538 A1 2/2004 Kunert et al.
2021/0188687 A1 * 6/2021 Frost ...................... A61J 1/065
2024/0010543 A1 1/2024 Humbertjean et al.

FOREIGN PATENT DOCUMENTS

JP 54-143419 A 11/1979

OTHER PUBLICATIONS

CN 109437529 machine translation, Zhang et al., A Crystal Glass Cup, Mar. 2019 (Year: 2019).*

* cited by examiner

*Primary Examiner* — Queenie S Dehghan
(74) *Attorney, Agent, or Firm* — TAYLOR & EDELSTEIN, PC

(57) ABSTRACT

A process for the preparation of a glass container from a glass tube in a glass processing machine includes the steps of: I) heating the glass tube at a defined position between a first portion and a second portion to a temperature above a glass transition temperature of the glass tube while the glass tube is rotating around its longitudinal axis $L_{tube}$ and pulling apart the first portion and the second portion thereby separating the first portion from the second portion and forming a closed bottom at one end of the first portion; and II) moving a mold matrix of the glass processing machine towards the closed bottom and bringing the mold matrix into contact with the closed bottom. While bringing the mold matrix into contact with the closed bottom, a distance $Y_m$ between the mold matrix and a first clamping chuck of the glass processing machine is decreased stepwise.

19 Claims, 6 Drawing Sheets

100

FIG. 3B
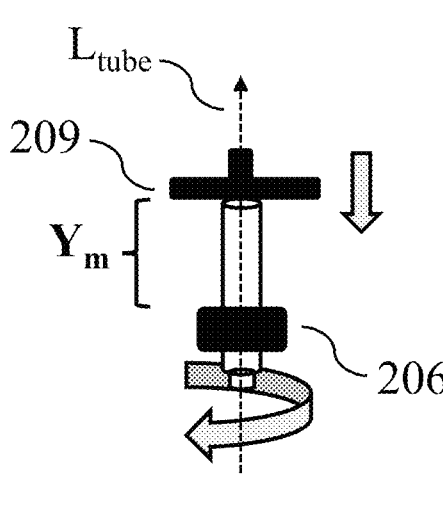
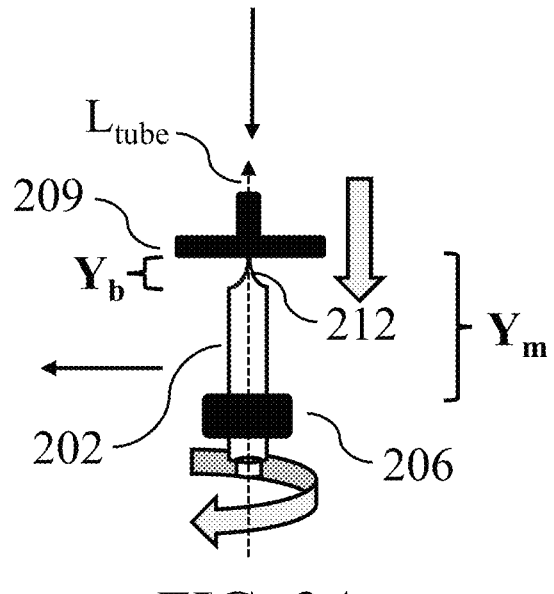
FIG. 3A
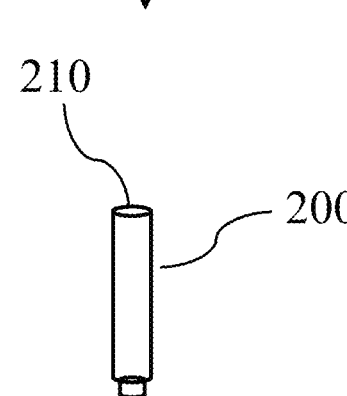
FIG. 3C

FIG. 4A
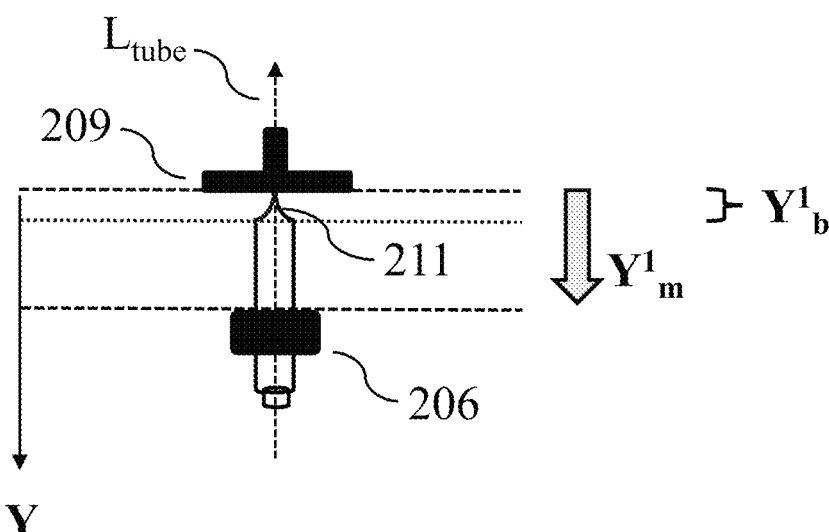
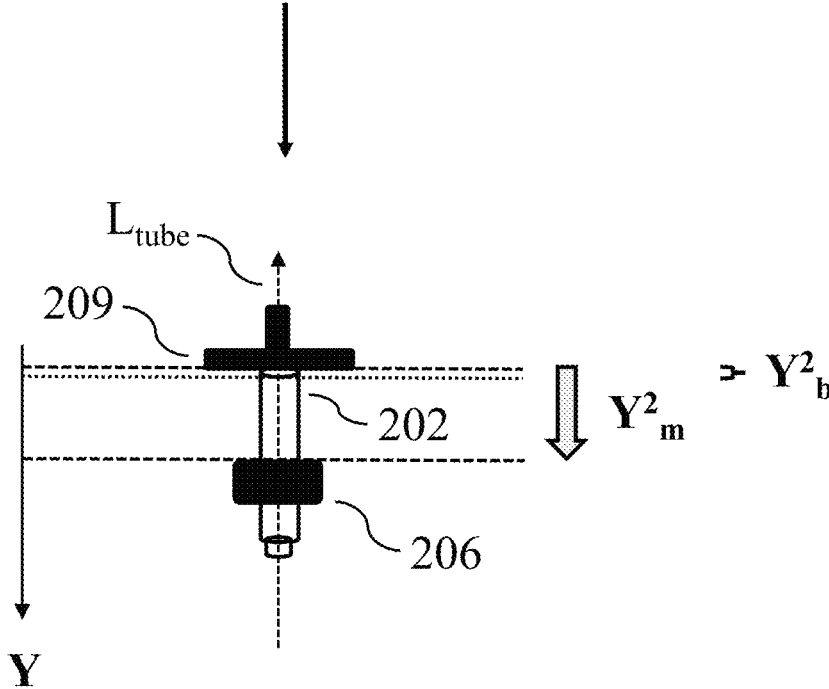
FIG. 4B

<u>300</u>

BOTTOM FORMING PROCESS

CROSS REFERENCE TO RELATED APPLICATIONS

This application claims priority to European Patent Application No. 22183916.0 filed on Jul. 8, 2022, which is incorporated in its entirety herein by reference.

BACKGROUND OF THE INVENTION

1. Field of the Invention

The present invention relates to a process for the preparation of a glass container from a glass tube in a glass processing machine, to glass containers and to a glass processing machine.

2. Description of the Related Art

Glass bottles that are used for pharmaceutical purposes (also known as so-called "vials") are usually prepared from borosilicate glass by hot-forming a borosilicate glass tube. In such a process in a first step the orifice of the vial is formed from the open tube end, wherein this orifice often has the form of a rolled-rim. Thereafter the vial bottom is formed and simultaneously the vial is separated from the residual of the glass tube. For the formation of the vial bottom the glass tube is, for example, secured in a vertical position by means of upper and lower clamping chucks and is then rotated around its longitudinal axis. The rotating glass tube in a certain region is heated by one or two separating gas burners until the heated mass of glass becomes deformable. As soon as this temperature is reached, the tube—under continuing rotation and heating by means of the burner—is extended in axial direction by means of a linear downwards movement of the lower chuck. Thereby the tube in the heated region extends under simultaneous tapering of its diameter, so that a constriction region in the form of a glass thread is formed. After the downward movement the constriction region is further heated. In this way the glass tube at the constriction region further contracts by the flow pressure of the burner gases so that the glass walls in the heated region melt together and finally the connection between the upper and the lower tube region pulls off. Thus, two tube regions (or sections) with closed ends are generated, wherein the lower tube region is the final vial, and the upper tube region is the residual glass tube from which further vials can be formed. In a subsequent step below the upper tube section a so-called "piercing burner" is placed to melt again the bottom of the upper tube section.

For the formation of the final shape of the glass bottom, different approaches have been applied.

In a first approach, the final shape of the glass bottom is formed using molding tools, for example in the form of a stamp, that are pressed against the molten mass of glass, as it is shown, for example, in U.S. Pat. No. 3,222,157 A. By such a mold matrix it can be ensured that the glass containers are prepared within the required dimensional tolerances with respect to their height and the recess in the middle of the glass bottom. At the same time, the molding tool ensures that the glass containers can stand in a stable fashion on a plane base. A large variety of materials are used for the molding tools which are capable of withstanding the prevailing temperatures and are sufficiently resistant against abrasion, e.g., various ceramic materials such as ceramically bound SiC. However, since the mold matrix in this first approach is in direct contact with the rotating mass of molten glass during the shaping, even tiny irregularities in the outer surface of the molding tool will appear as grooves in the glass bottom. Such grooves, however, may have a disadvantageous effect on the mechanical stability of the glass containers, particularly towards axial loads.

In a second approach, the final shape of the glass bottom is formed in a contact-free manner. U.S. Pat. No. 3,215,517 A, for example, discloses a process of free-shaping of the glass bottom of a glass container. In this process, the bottom is shaped without any pressing of a molding tool. The container, which is readily shaped in the orifice region, is severed from the remainder of the tube according to its required height and is molten together. By providing a precise setting of the burner it is possible to form the bottom without allowing it to come into contact with shaping material. A further contact-free approach of forming the final shape of a glass bottom is disclosed in US 2004/025538 A1. Here, molding tools are used which, in contrast to the approach disclosed in U.S. Pat. No. 3,222,157 A, do not come into direct contact with the glass surface, but are separated from the glass surface by an air cushion that is provided between the upper surface of the molding tool and the mass of molten glass. Due to the lack of direct contact between the mass of molten glass and the molding tool, grooves or irregularities in the circular glass bottom can be prevented. However, containers which are produced by free-shaping of the glass bottom show higher dimensional tolerances than containers in which the final shape of the glass bottom has been prepared using molding tools that come into direct contact with the mass of molten glass. As in case of glass vials used for pharmaceutical compositions the filled and sealed vials, i.e., the finished medical product, are usually optically inspected in automated and adaptive optical inspection machines, the high manufacturing tolerance with respect to the bottom geometry leads to a large number of results that cannot be interpreted by these inspection machines and whose associated products are ejected from the automated process.

What is needed in the art is a way to at least partly overcome a disadvantage arising from the prior art.

SUMMARY OF THE INVENTION

Exemplary embodiments provided according to the present invention provide a process for the preparation of a glass container in a glass processing machine, particularly for the preparation of glass vials, which combines the advantages of a process in which the final shape of the glass bottom is prepared by direct contact of the molten glass with a molding tool (i. e., the preparation of glass containers with low dimensional tolerances) and of a process in which the final shape of the glass bottom is prepared in a contact-free manner (i. e., the preparation of glass containers being almost free of tiny irregularities on the outside of the circular glass bottom and being characterized by a high mechanical stability, particularly towards axial loads). More particularly, exemplary embodiments provided according to the present invention provide a process for the preparation of a glass container in a glass processing machine, particularly for the preparation of glass vials, which allows the preparation of glass vials with a reduced manufacturing tolerance compared to the process known from the prior art, particularly with a reduced manufacturing tolerance with respect to the bottom geometry, more particularly with respect to the evenness of the glass in the bottom region. Moreover, the glass containers obtained by such a process should be characterized in that they can be inspected in an optical inspection machine with a reduced number of vials that are ejected because the result obtained by optical inspection of that vial cannot be interpreted.

In some embodiments provided according to the present invention, a process for the preparation of a glass container from a glass tube in a glass processing machine is provided. The glass tube includes a first portion with a first end, a second portion with a second end, and a longitudinal axis ($L_{tube}$) that passes through a center of the first end and the second end. The glass processing machine includes a plurality of processing stations, a first clamping chuck and a second clamping chuck which are adapted and arranged to hold the glass tube while rotating the glass tube around its longitudinal axis $L_{tube}$ and to transport the rotating glass tube from one glass container processing station to the next one, a heating device, and a mold matrix. The process includes the steps of: I) heating the glass tube at a defined position between the first portion and the second portion to a temperature above a glass transition temperature of the glass tube while the glass tube is rotating around its longitudinal axis $L_{tube}$ and pulling apart the first portion from the second portion thereby separating the first portion from the second portion and forming a closed bottom at one end of the first portion; and II) moving the mold matrix towards the closed bottom and bringing the mold matrix into contact with the closed bottom, wherein, while bringing the mold matrix into contact with the closed bottom, a distance $Y_m$ between the mold matrix and the first clamping chuck is decreased stepwise.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 3A-C illustrate process step II) of the process provided according to the present invention;

FIGS. 4A-B illustrates in more detail the movement of the mold matrix relative to the first clamping chucks in process step II) of the process provided according to the present invention;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
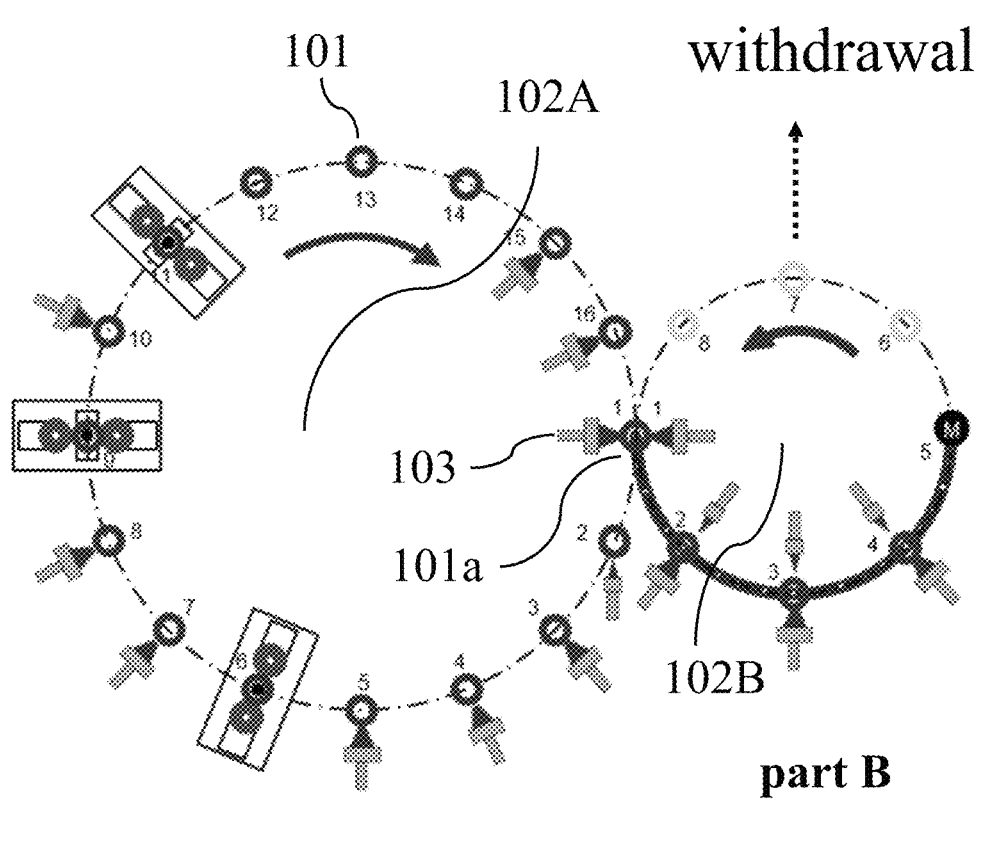
FIG. 1 illustrates a glass processing machine that illustrates a process for the preparation of glass container provided according to the present invention.

In some exemplary embodiments provided according to the present invention, a process for the preparation of a glass container from a glass tube in a glass processing machine is provided. The glass tube comprises a first portion with a first end, a second portion with a second end and a longitudinal axis $L_{tube}$ that passes through the centre of the first and the second end. The glass processing machine comprises a plurality of processing stations, first and second clamping chucks which are adapted and arranged to hold the glass tube while rotating the glass tube around its longitudinal axis $L_{tube}$ and to transport the rotating glass tube from one glass container processing station to the next one, a heating device and a mold matrix. The process comprises the following steps:

I) heating the glass tube at a defined position between the first portion and the second portion to a temperature above the glass transition temperature, optionally above the softening temperature of the glass, while the glass tube is rotating around its longitudinal axis $L_{tube}$ and pulling apart the first portion and the second portion thereby separating the first portion from the second portion and forming a closed bottom at one end of the first portion;

II) moving the mold matrix towards the closed bottom and bringing the mold matrix into contact with the closed bottom;

wherein, while bringing the mold matrix into contact with the closed bottom in process step II), a distance $Y_m$ between the mold matrix and the first clamping chuck is decreased stepwise.

Surprisingly, it has been discovered that—if in a process according to the above described approach of forming the final shape of the glass bottom (i. e., in a process in which a direct contact between a molding tool and the mass of molten glass occurs)—the mold matrix is brought into contact with the mass of molten glass at the closed bottom in such a way that a distance $Y_m$ between the mold matrix and the first clamping chuck is decreased stepwise, glass containers can be obtained that are not only characterized by a particularly high evenness of the outer surface of the glass bottom and a high mechanical strength, particularly towards axial loads, but that also show a reduced manufacturing tolerance.

The "softening temperature" of the glass is the temperature at which the glass has a viscosity (determined according to ISO 7884-6:1987) of $10^{7.6}$ dPaxsec.

The "distance $Y_m$ between the mold matrix and the first clamping chuck" is the shortest distance between the upper end of the first clamping chuck and the bottom end of the mold matrix, i. e., the surface of the mold matrix that comes into contact with the mass of molten glass, wherein $Y_m$ is measured in a direction parallel to longitudinal axis $L_{tube}$ as shown in FIG. 3A and FIG. 3B.

In some embodiments of the process provided according to the present invention, the first and second clamping chucks are adapted and arranged to hold the glass tube in a vertical position; wherein the second portion of the glass tube corresponds to the upper portion of the glass tube having an upper end and the first portion of the glass tube corresponds to the lower portion of the glass tube having a lower end; wherein the first clamping chucks are arranged as lower clamping chucks holding the lower portion of the glass tube and the second clamping chucks are arranged as upper clamping chucks holding the upper portion of the glass tube;

and/or, optionally and wherein the one end is opposite of the lower end.

In some embodiments of the process provided according to the present invention, the process further comprises a step Ia), between process step I) and process step II), of heating the closed bottom to a temperature above the glass transition temperature, optionally above the softening temperature of the glass.

In some embodiments of the process provided according to the present invention, the process further comprises a step Ib), between process step I) and process step II), optionally between step Ia) and step II), of moving the mold matrix towards the closed bottom; wherein the closed bottom is not in contact with the mold matrix; and/or, optionally and, wherein the final distance defined by a gap $Y_b$ between the closed bottom and the mold matrix is 8 mm or more, optionally 10 mm or more, optionally 12 mm or more, and/or 20 mm or less, optionally 18 mm or less, optionally 16 mm or less.

The "final distance" defined by a gap $Y_b$ optionally corresponds to the static distance of the mold matrix from the closed bottom in the corresponding process step after any movement and is measured in a direction parallel to longitudinal axis $L_{tube}$ as shown in FIGS. 4A-4B. The "gap $Y_b$" is optionally the shortest distance between outermost point (largest radius) of closed bottom surface and contact surface of the mold matrix, this distance again being measured in a direction parallel to longitudinal axis $L_{tube}$ as shown in FIGS. 4A-4B.

In some embodiments of the process provided according to the present invention, in process step II), optionally in process steps Ib) and II), the mold matrix is moved downwards; wherein optionally in process step I) the lower portion of the glass tube is pulled downwards by moving downwards the lower clamping chucks.

In some embodiments of the process provided according to the present invention, an air flow is applied through the first end of the first portion towards the closed bottom, optionally during process step II), optionally during process steps Ia), Ib) and II).

In some embodiments of the process provided according to the present invention, an air flow directed towards the closed bottom is applied; optionally during process step II), optionally during process steps Ib) and II).

In some embodiments of the process provided according to the present invention, the distance $Y_m$ between the mold matrix and the first clamping chuck in process step II) is decreased in a first step IIa) and a second step IIb), optionally further decreased in a third step IIc).

In some embodiments of the process provided according to the present invention, the mold matrix is in contact with 50% or more, optionally 55% or more, optionally 60% or more, optionally 65% or more, and/or 90% or less, optionally 85% or less, optionally 80% or less, optionally 75% or less, of the surface area of the closed bottom during the first step IIa).

The "surface area of the closed bottom" is optionally $\pi \times (d_1/2)^2$, wherein $d_1$ corresponds to outer diameter of the glass tube as that is heated in process step I).

In some embodiments of the process provided according to the present invention, the mold matrix is in contact with 65% or more, optionally 70% or more, optionally 75% or more, optionally 80% or more, and/or 100% or less, optionally 97% or less, optionally 95% or less, optionally 90% or less, of the surface area of the closed bottom during the second step IIb).

In some embodiments of the process provided according to the present invention, the distance $Y_m$ between the mold matrix and the first clamping chuck is decreased in a first step IIa) by a first distance $Y^1_m$ and a second step IIb) by a second distance $Y^2_m$, wherein the first step IIa) and the second step IIb) are optionally successive. $Y^1_m$ and $Y^2_m$ are measured in a direction parallel to longitudinal axis $L_{tube}$.

In some embodiments of the process provided according to the present invention, the first distance $Y^1_m$ is larger than the second distance $Y^2_m$.

In some embodiments of the process provided according to the present invention, the ratio between the first distance $Y^1_m$ and the second distance $Y^2_m$ is at least 10:1, optionally at least 15:1, optionally at least 30:1, optionally at least 50:1 and/or optionally less than 1000:1, optionally less than 500:1 and optionally less than 100:1.

In some embodiments of the process provided according to the present invention, the first distance $Y^1_m$ is 19 mm or less, optionally 17 mm or less, optionally 15 mm or less, optionally 13 mm or less, and/or 5 mm or more, optionally 7 mm or more, optionally 9 mm or more, optionally 11 mm or more.

In some embodiments of the process provided according to the present invention, the second distance $Y^2_m$ is 1 mm or less, optionally 0.8 mm or less, optionally 0.6 mm or less, optionally 0.5 mm or less, and/or 0.1 mm or more, optionally 0.2 mm or more, optionally 0.3 mm or more, optionally 0.4 mm or more.

In some embodiments of the process provided according to the present invention, there is a time delay $\Delta t$ between the first step IIa) and the second step IIb).

In some embodiments of the process provided according to the present invention, the time delay $\Delta t$ is 0.1 sec or more, optionally 0.5 sec or more, optionally 1 sec or more, optionally 1.5 sec or more, and/or 5 sec or less, optionally 4 sec or less, optionally 3 sec or less, optionally 2 sec or less.

In some embodiments of the process provided according to the present invention, the final distance defined by a gap $Y_b$ between the mold matrix and closed bottom is in a first step IIa) defined by a first gap $Y^1_b$ and in a second step IIb) defined by a second gap $Y^2_b$, optionally the first step IIa) and the second step IIb) are successive.

In some embodiments of the process provided according to the present invention, the first gap $Y^1_b$ is larger than the second gap $Y^2_b$.

In some embodiments of the process provided according to the present invention, the ratio between the first gap $Y^1_b$ and the second gap $Y^2_b$ is at least 5:1, optionally at least 7:1, optionally at least 10:1, optionally at least 15:1 and/or optionally less than 200:1, optionally less than 100:1.

In some embodiments of the process provided according to the present invention, the first gap $Y^1_b$ is 8 mm or less, optionally 7 mm or less, optionally 6 mm or less, optionally 5 mm or less, and/or 1 mm or more, optionally 2 mm or more, optionally 3 mm or more, optionally 4 mm or more.

In some embodiments of the process provided according to the present invention, the second gap $Y^2_b$ is 2 mm or less, optionally 1 mm or less, optionally 0.8 mm or less, optionally 0.6 mm or less, optionally 0.5 mm or less and/or 0.05 mm or more, optionally 0.1 mm or more, optionally 0.2 mm or more, optionally 0.3 mm or more, optionally 0.4 mm or more.

In some embodiments of the process provided according to the present invention, the mold matrix comprises, optionally is made of, carbon and/or ceramic.

In some embodiments of the process provided according to the present invention, the closed bottom is of circular shape.

In some embodiments provided according to the present invention, a glass container is obtainable by the process provided according to the invention.

In some embodiments provided according to the present invention, a glass processing machine comprises:

a) a plurality of glass container processing; stations and b) first and second clamping chucks which are adapted and arranged to hold a glass tube while rotating the glass tube around its longitudinal axis $L_{tube}$ and to transport the rotating glass tube from one glass container processing station to the next one, wherein the glass processing machine comprises, as one of the processing stations, a bottom contour forming station that comprises a mold matrix adapted and arranged to form a closed bottom of the glass tube, wherein the mold matrix is adapted and arranged such that it can be moved stepwise in at least one direction.

In some embodiments of the glass processing machine provided according to the present invention, the clamping chucks are adapted such that they can be rotated, optionally at 200 to 400 rpm; and/or, optionally and, the mold matrix is fixed.

In some embodiments of the glass processing machine provided according to the present invention, the mold matrix is adapted and arranged such that it can be moved towards first clamping chucks which hold the glass tube comprising a closed bottom the contour of which is to be formed in the bottom contour forming station, wherein a distance $Y_m$ between the mold matrix and the first clamping chuck can be decreased stepwise.

In some embodiments of the glass processing machine provided according to the present invention, the first clamping chucks are adapted and arranged to hold the glass tube in a vertical position.

In some embodiments of the glass processing machine provided according to the present invention, the bottom contour forming station comprises a first air supply unit by which an air flow can be directed through an open end of the glass tube comprising a closed bottom the contour of which is to be formed in the bottom contour forming station towards the closed bottom.

In some embodiments of the glass processing machine provided according to the present invention, the bottom contour forming station comprises a second air supply unit by which an air flow can be applied towards the closed bottom.

In some embodiments of the glass processing machine provided according to the present invention, the mold matrix is adapted and arranged such that the distance $Y_m$ between the mold matrix and the first clamping chuck can be decreased in a first step, and a second step, optionally further decreased in a third step.

In some embodiments of the glass processing machine provided according to the present invention, the mold matrix is adapted and arranged such that the distance $Y_m$ between the mold matrix and the first clamping chuck can be decreased in a first step by a first distance $Y^1_m$ and a second step by a second distance $Y^2_m$, wherein the first step and the second step are optionally successive.

In some embodiments of the glass processing machine provided according to the present invention, the first distance $Y^1_m$ is larger than the second distance $Y^2_m$.

In some embodiments of the glass processing machine provided according to the present invention, the ratio between the first distance $Y^1_m$ and the second distance $Y^2_m$ is 10:1, optionally 15:1, optionally 30:1, optionally 50:1.

In some embodiments of the glass processing machine provided according to the present invention, the first distance $Y^1_m$ is 19 mm or less, optionally 17 mm or less, optionally mm or less, optionally 13 mm or less, and/or 5 mm or more, optionally 7 mm or more, optionally 9 mm or more, optionally 11 mm or more.

In some embodiments of the glass processing machine provided according to the present invention, the second distance $Y^2_m$ is 1 mm or less, optionally 0.8 mm or less, optionally mm or less, optionally 0.5 mm or less, and/or 0.1 mm or more, optionally 0.2 mm or more, optionally 0.3 mm or more, optionally 0.4 mm or more.

In some embodiments of the glass processing machine provided according to the present invention, the mold matrix is adapted and arranged such that there is a time delay $\Delta t$ between the first step and the second step.

In some embodiments of the glass processing machine provided according to the present invention, the time delay is 0.1 sec or more, optionally 0.5 sec or more, optionally 1 sec or more, optionally 1.5 sec or more, and/or 5 sec or less, optionally 4 sec or less, optionally 3 sec or less, optionally 2 sec or less.

In some embodiments of the glass processing machine provided according to the present invention, the mold matrix comprises, optionally is made of, carbon and/or ceramic.

Glass Container

The glass container provided according to the invention or the glass container contained in the plurality of glass containers provided according to the invention may have any size or shape which the skilled person deems appropriate in the context of the invention. Optionally, the top region of the glass container comprises an opening, which allows for inserting a pharmaceutical composition into the interior volume of the glass container. The glass container comprises as container parts a glass body in the form of a glass tube with a first end and a further end and a circular glass bottom that closes the glass body at the first end. Optionally, the glass container is of a one-piece design that is prepared by providing a glass tube and by shaping one end thereof (i. e. the end that will be the opening of the glass container) so as to obtain a top region, a junction region, a neck region and a shoulder region followed by a step of shaping the further end of the glass tube so as to obtain a closed glass bottom. An exemplary glass container is a pharmaceutical glass container, optionally one selected from the group consisting of a vial, an ampoule or a combination thereof.

For the use in this document, the interior volume V, represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may, for example, be less than the interior volume by a factor of about 0.5.

Glass

The glass of the container may be any type of glass and may consist of any material or combination of materials which the skilled person deems suitable in the context of the invention. Optionally, the glass is suitable for pharmaceutical packaging. In some embodiments, the glass is of type I, optionally type I b, in accordance with the definitions of glass types in section 3.2.1 of the European Pharmacopoeia, $7^{th}$ edition from 2011. Additionally, or alternatively to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, optionally more than 9 wt.-%, for example in a range from 9 to 20 wt.-%, in each case based on the total weight of the glass. An exemplary aluminosilicate glass has a content of $B_2O_3$ of less than 8 wt.-%, optionally at maximum 7 wt.-%, optionally in a range from to 7 wt.-%, in each case based on the total weight of the glass. For the use in this document, a borosilicate glass is a glass which has a content of $B_2O_3$ of at least 1 wt.-%, optionally at least 2 wt.-%, optionally at least 3 wt.-%, optionally at least 4 wt.-%, optionally at least 5 wt.-%, for example in a range from 5 to 15 wt.-%, in each case based on the total weight of the glass. An exemplary borosilicate glass has a content of $Al_2O_3$ of less than 7.5 wt.-%, optionally less than 6.5 wt.-%, optionally in a range from 0 to 5.5 wt.-%, in each case based on the total weight of the glass. In some embodiments, the borosilicate glass has a content of $Al_2O_3$ in a range from 3 to 7.5 wt.-%, optionally in a range from 4 to 6 wt.-%, in each case based on the total weight of the glass.

A glass which is exemplary according to the invention is essentially free from B. Therein, the wording "essentially free from B" refers to glasses which are free from B which has been added to the glass composition by purpose. This means that B may still be present as an impurity, but optionally at a proportion of not more than 0.1 wt.-%, optionally not more than wt.-%, in each case based on the weight of the glass.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of %.

Wall Thicknesses and Diameters

The wall thickness of the glass container at a given position as well as the inner or outer diameter of the glass container at a given position are determined in accordance with DIN ISO 8362-1.

Example

A glass tube (Fiolax® clear, Schott AG, Germany) having an outer diameter $d_1$ of 16 mm and a wall thickness $s_1$ of 1.2 mm is loaded into the head of a rotary machine. While rotating around its major axis the glass tube is heated to its softening point with separation gas burners as shown in FIG. 1 and the heated glass is pulled along its major axis by moving the clamping chucks creating two separate portions of glass tube and forming a closed bottom at the upper end of the lower portion. Consecutively, the closed bottom is heated with gas burners to the glass transition temperature and brought into contact with a carbon mold matrix as further depicted in FIG. 1. When bringing the mold matrix into contact with the closed bottom, the distance is decreased stepwise in a first and second step. The ratio of the distance decreased in the first step to the distance decreased in the second step ($Y^1_m/Y^2_m$; see FIG. 2) was 30. Furthermore, the second step was performed with a time delay ($\Delta t$) of 1.5 sec after the first step. In a Comparative Example representing the prior-art process the mold matrix is brought into contact with the closed bottom in a single step without any delay.

The conditions applied when forming the closed bottom in the Example according to the present invention and the Comparative Example are summarized in the following table:

| | Example according to the present invention | Comparative Example |
|---|---|---|
| $Y^1_m$ | 15 mm | 16 mm |
| $Y^2_m$ | 0.5 mm | — |
| $Y^1_m/Y^2_m$ | 30 | — |
| $\Delta t$ | 1.5 sec | 0 |

Referring specifically now to the drawings, FIG. 1 shows a glass processing machine 100 that illustrates a process for the preparation of glass container 300 according to the present invention. In such a glass processing machine 100 both the tubes (part A: large wreath 102A) and the separated vials (part B: small wreath 102B) are held vertically in rotating chucks on two adjacent rotating rings 102A, 102B. This type of machine has the working positions (1 to 16: part A and 1 to 8: part B) arranged one after, between which the tubes and vials are transported by the wreaths in clocked fashion. Station 101a at the point that connects the two rings 102A,102B corresponds to the separation station at which the glass tube is heated at a defined position by two separation gas burners 103 so far that it becomes deformable. As soon as this temperature is reached, the tube—under continuing rotation and heating by the burner 103—is extended in axial direction by a linear downwards movement of the lower chuck (see reference number 206 in FIG. 2). Thereby the tube in the heated region extends under simultaneous tapering of its diameter, so that a constriction region in the form of a glass thread results. After the downward movement the constriction region can be further heated. After the lower portion of the glass tube has been finally separated (end of process step I; see FIGS. 2A-C) of the process provided according to the present invention), the glass is liquefied on positions 2 to 4 of the B-wreath 102B under massive input of heat at the upper edge of the of the lower portion of the glass tube in order to finally shape the bottom geometry (see FIGS. 3A-C).

Figures 2A, 2B, 2C:
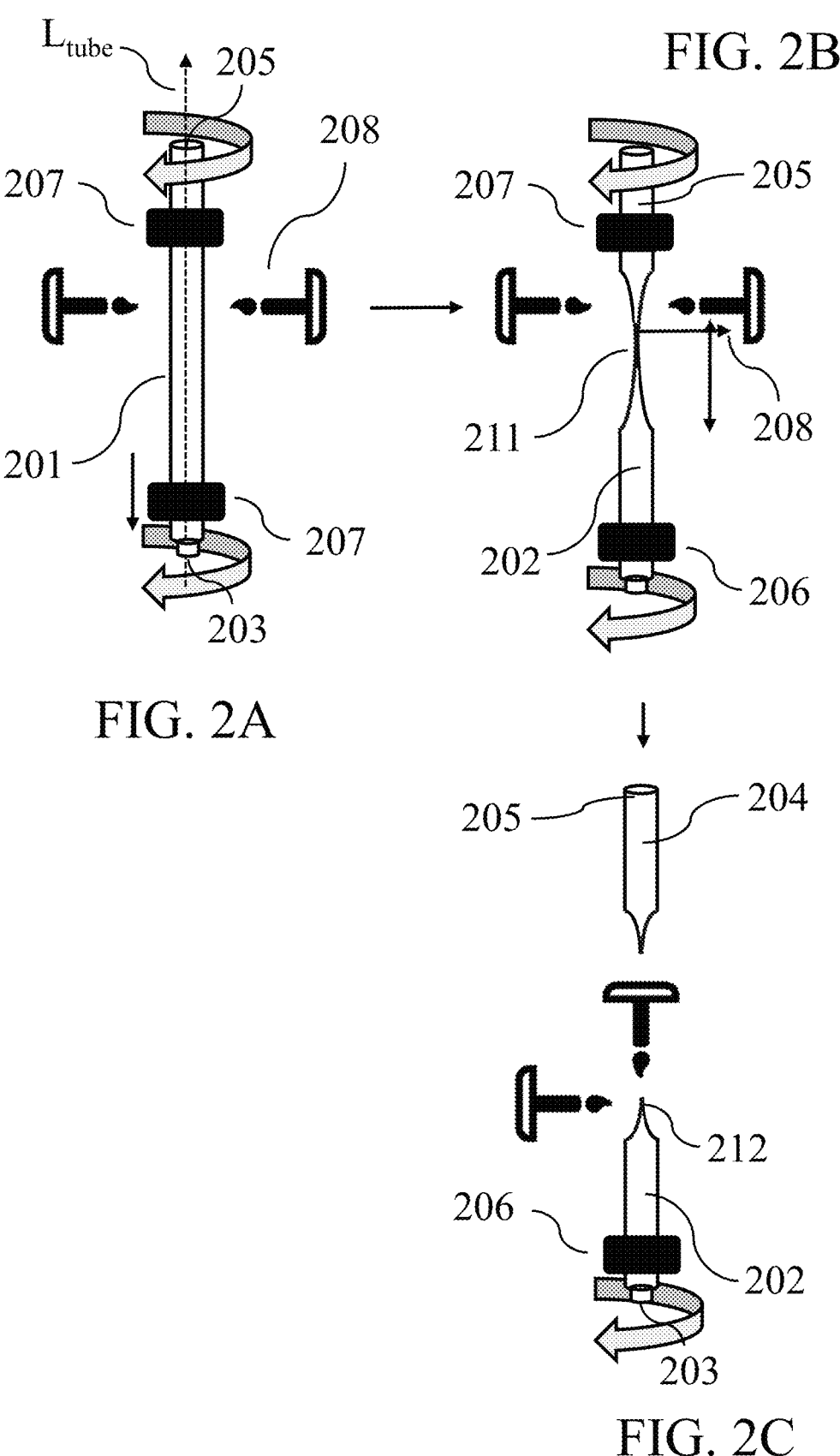
FIGS. 2A-C illustrate process step I) of the process provided according to the present invention.

FIGS. 2A-C illustrate process step I) of the process provided according to the present invention as it can be performed, for example, at separation station 102a in glass processing machine shown in FIG. 1. A glass tube 201 that comprises a first portion 202 with a first end 203, a second portion 204 with a second end 205 and a longitudinal axis $L_{tube}$ that passes through the center of the first and the second end (203, 205) is loaded in a glass processing machine 100 comprising a plurality of processing stations 101, first and second clamping chucks 206, 207 which are adapted and arranged to hold the glass tube 201 while rotating the glass tube 201 around its longitudinal axis $L_{tube}$ and to transport the rotating glass tube 201 from one glass container processing station 101 to the next one, a heating device 208 and a mold matrix 209. In process step I) of the process provided according to the present invention the glass tube 201 is heated at a defined position between the first portion 202 and the second portion 204 to a temperature above the glass transition temperature while the glass tube 201 is rotating around its longitudinal axis $L_{tube}$ (FIG. 2A) and the first portion 202 and the second portion 204 are pulled apart (FIG. 2B). In the process shown in FIG. 2, the first portion 202 and the second portion 204 are pulled apart by moving downwards the lower clamping chucks 206 while the glass tube 201 is rotating around its longitudinal axis $L_{tube}$. When moving downwards the lower clamping chucks 206 and thus also the lower portion 202 of the glass tube 201, a glass thread 212 is formed (see FIG. 2B). At the end of process step I) the first portion 202 is separated from the second portion 204 and a closed bottom 210 is formed at one end 212 of the first portion 202 (FIG. 2C).

FIGS. 3A-C illustrate process step II) of the process provided according to the present invention. As shown in these figures, a mold matrix 209 is moved towards the closed bottom 210 and is brought into contact with the closed bottom 210 of the first portion 202. As shown in FIGS. 3A-C, the process provided according to the present invention is characterized in that, while bringing the mold matrix 209 into contact with the closed bottom 210, a distance $Y_m$ between the mold matrix 209 and the first clamping chuck 206 is decreased stepwise, wherein—as shown by the dashed lines in FIGS. 4A-4B-$Y_m$ is the shortest distance between the upper end of the first clamping chuck 206 and the bottom end of the mold matrix 209, i. e., the surface of the mold matrix 209 that comes into contact with the mass of molten glass at the closed bottom 210, wherein $Y_m$ is measured in a direction parallel to longitudinal axis $L_{tube}$. In the exemplary embodiment of the process provided according to the present invention as shown in FIGS. 2A-3C, the first and second clamping chucks 206, 207 are adapted and arranged to hold the glass tube 201 in a vertical position, wherein the second portion 204 of the glass tube 201 corresponds to the upper portion 204 of the glass tube 201 having an upper end 205 and the first portion 202 of the glass tube 201 corresponds to the lower portion 202 of the glass tube 201 having a lower end 203. Accordingly, the first clamping chucks 206 are arranged as lower clamping chucks 206 holding the lower portion 202 of the glass tube 201 and the second clamping chucks 207 are arranged as upper clamping chucks 207 holding the upper portion 205 of the glass tube 201, wherein the one end 212 is opposite of the lower end 203.

FIGS. 4A-4B show in more detail the movement of the mold matrix 209 relative to the first clamping chucks 206 in process II) of the process provided according to the present invention. As shown in that figure, distance $Y_m$ between the mold matrix 209 and the first clamping chuck 206 is decreased in a first step (as shown in FIG. 4A) by a first distance $Y^1_m$ and a second step (as shown in FIG. 4B) by a second distance $Y^2_m$, optionally the first step and the second step are successive. As shown in FIGS. 4A-4B, the first distance $Y^1_m$ is larger than the second distance $Y^2_m$, wherein the first distance $Y^1_m$ is 19 mm or less, and the second distance $Y^2_m$ is 1 mm or less. Optionally, there is a time delay $\Delta t$ between the first step shown in FIG. 4A and the second step shown in FIG. 4B, wherein $\Delta t$ optionally is 0.1 sec or more.

As also shown in FIGS. 4A-4B, the final distance defined by a gap $Y_b$ between the mold matrix 209 and closed bottom 210 is in the first step optionally defined by a first gap $Y^1_b$ and in the second step optionally defined by a second gap $Y^2_b$, wherein it is also optional that the first gap $Y^1_b$ is larger than the second gap $Y^2_b$. It is also optional that the first gap $Y^1_b$ is 8 mm or less and that the second gap $Y^2_b$ is 2 mm or less.

Figure 5:
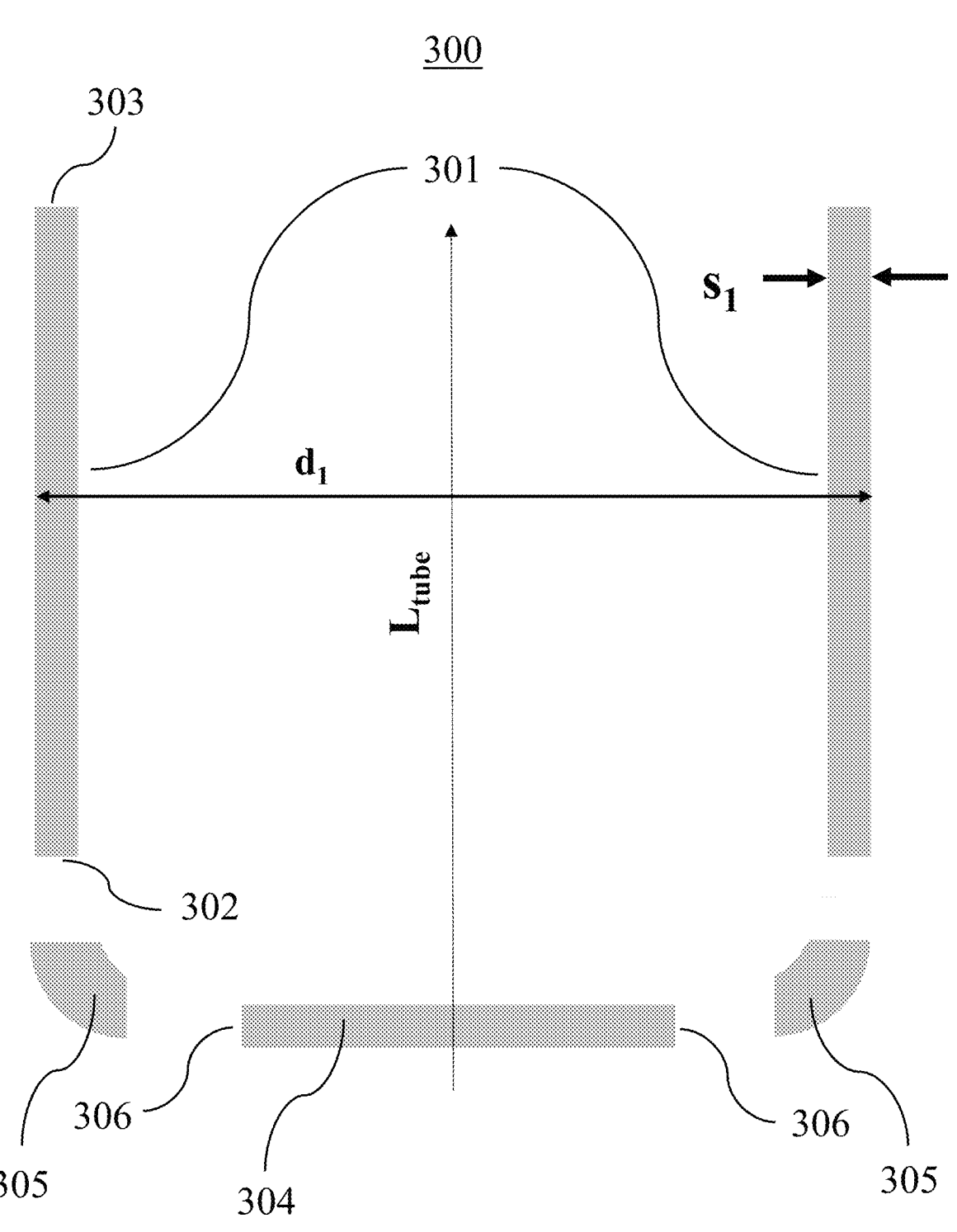
FIG. 5 illustrates a cross-sectional view of a glass container provided according to the present invention, wherein for the purpose of an improved illustration the parts of the glass container (i. e. glass tube, glass bottom and curved glass heel) have been separated from each other.

FIG. 5 shows a cross-sectional view of a glass container 300 provided according to the invention. For the purpose of an improved illustration the individual parts of the glass container (i. e. glass tube 301, glass bottom 304 and curved glass heel 305) have been separated from each other. However, as the glass container 300 provided according to the invention is obtained by a process in which a mother tube (which forms glass tube 301), while rotating around its major axis, is heated to its softening point with flames, in which the heated glass is pulled along its major axis for stretching and creating a container closure and in which the container closure has been shaped to form a glass bottom 304 and a curved glass heel 305, these parts are integrally connected in the glass container 300 provided according to the present invention. As shown in FIG. 5, the glass tube 301 is characterized by a first end 302 and a further end 303. The glass bottom 304 comprises an outer region 306 that in the glass container 300 is connected to the curved glass heel 305. The glass tube 301 is characterized by a longitudinal axis $L_{tube}$, an outer diameter $d_1$ and a wall thickness $s_1$.

Figure 6:
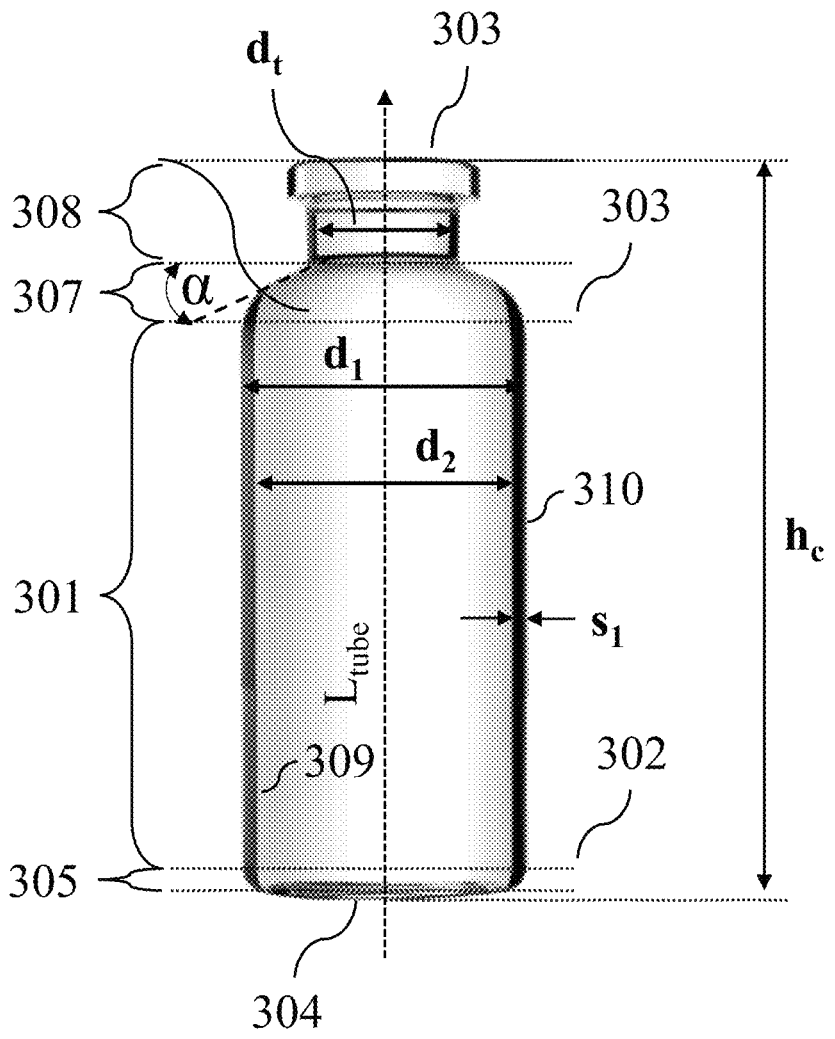
FIG. 6 illustrates a side view of a glass container obtainable by the process provided according to the present invention.

FIG. 6 shows a side view of glass container 300 obtainable by the process provided according to the present invention. The glass container 300 comprises as a container part a glass body 301 in the form of a glass tube having a glass thickness $s_1$ and an inner diameter $d_2$ (which correspond to the thickness and the inner diameter of the glass tube 201 that has been used to prepare the container 300) with a first end 302 and a further end 303, the glass body 301 being characterized by a longitudinal axis $L_{tube}$ that passes through the centre of the first and the further end 302,303. The glass container 300 further comprises as a container part a circular glass bottom 304 that closes the glass body 301 at the first end 302. The glass container 300 further comprises a curved glass heel 305 extending from an outer end of the circular glass bottom 304 to the first end 302 of the glass body 301. In addition to the container parts shown in FIG. 5, the glass container 300 further comprises a top region 308 in which the inner diameter of the glass tube is $d_t<d_2$, the top region optionally comprising an opening of the glass container, and a shoulder region 307 that connects the further end 303 of the glass tube forming the body region 301 with the top region 308, wherein the shoulder region 307 is characterized by a shoulder angle $\alpha$.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 100 glass processing machine
101,101a,101b,101c processing stations
102, 102A, 102B circle (or wreath) comprising processing stations 107
103 separation gas burner
200 glass container
201 glass tube
202 first or lower portion of the glass tube 201
203 first or lower end of the first or lower portion 202
204 second or upper portion of the glass tube 201
205 second or upper end of the second or upper portion 204
206 first or lower clamping chucks
207 second or upper clamping chucks
208 heating device, optionally a separation gas burner
209 mold matrix
210 closed bottom
211 glass thread
212 one end of the first or lower end of the first or lower portion 202
300 glass container
301 glass body 302 first end of glass body 301
303 further end of glass body 301
304 glass bottom
305 curved glass heel
306 outer end of the glass bottom 304
307 shoulder region
308 top region
309 inner surface of the glass container
310 outer surface of the glass container

What is claimed is:

1. A process for the preparation of a glass container from a glass tube in a glass processing machine, the glass tube comprising a first portion with a first end, a second portion with a second end, and a longitudinal axis ($L_{tube}$) that passes through a center of the first end and the second end, the glass processing machine comprising a plurality of processing stations, a first clamping chuck and a second clamping chuck which are adapted and arranged to hold the glass tube while rotating the glass tube around its longitudinal axis $L_{tube}$ and to transport the rotating glass tube from one glass container processing station to the next one, a heating device, and a mold matrix, the process comprising the steps of I) heating the glass tube at a defined position between the first portion and the second portion to a temperature above a glass transition temperature of the glass tube while the glass tube is rotating around its longitudinal axis $L_{tube}$ and pulling apart the first portion and the second portion thereby separating the first portion from the second portion and forming a closed bottom at one end of the first portion; and II) moving the mold matrix towards the closed bottom and bringing the mold matrix into contact with the closed bottom, wherein, while bringing the mold matrix into contact with the closed bottom, a distance $Y_m$ between the mold matrix and the first clamping chuck is decreased stepwise, wherein the distance $Y_m$ between the mold matrix and the first clamping chuck is decreased in a first step IIa) by a first distance $Y^1_m$ and a second step IIb) by a second distance $Y^2_m$, wherein between the first step IIa) and the second step IIb) there is a time delay At and the time delay is 0.1 sec or more and/or 5 sec or less.

2. The process of claim 1, wherein the first clamping chuck and the second clamping chuck are adapted and arranged to hold the glass tube in a vertical position; wherein the second portion of the glass tube corresponds to an upper portion of the glass tube having an upper end and the first portion of the glass tube corresponds to a lower portion of the glass tube having a lower end; wherein the first clamping chuck is arranged as a lower clamping chuck holding the lower portion of the glass tube and the second clamping chuck is arranged as an upper clamping chuck holding the upper portion of the glass tube; and wherein the one end is opposite of the lower end.

3. The process according of claim 1, further comprising a step Ia), between process step I) and process step II), of heating the closed bottom to a temperature above the glass transition temperature.

4. The process of claim 1, further comprising a step Ib), between process step I) and process step II), of moving the mold matrix towards the closed bottom;
wherein the closed bottom is not in contact with the mold matrix;
and/or
wherein a final distance defined by a gap between the closed bottom and the mold matrix is 8 mm or more and/or 20 mm or less.

5. The process of claim 1, wherein in process step II), the mold matrix is moved downwards.

6. The process of claim 5, wherein in process step I) a lower portion of the glass tube is pulled downwards by downwardly moving the first clamping chuck.

7. The process of claim 1, wherein an air flow is applied through the first end of the first portion towards the closed bottom and/or wherein an air flow directed towards the closed bottom is applied.

8. The process of claim 7, wherein the air flow applied through the first end of the first portion towards the closed bottom is applied during process step II); and/or the air flow directed towards the closed bottom is applied during process step II).

9. The process of claim 1, wherein the distance $Y_m$ between the mold matrix and the first clamping chuck is further decreased in a third step IIc).

10. The process of claim 1, wherein the mold matrix is in contact with 50% or more and/or 90% or less of a surface area of the closed bottom during the first step IIa) and/or wherein the mold matrix is in contact with 65% or more and/or 100% or less of the surface area of the closed bottom during the second step IIb).

11. The process of claim 10, wherein a final distance defined by a gap between the mold matrix and closed bottom is in a first step IIa) defined by a first gap and in a second step IIb) defined by a second gap.

12. The process of claim 11, wherein the first gap is 8 mm or less and/or 1 mm or more and/or wherein the second gap is 2 mm or less and/or 0.05 mm or more.

13. The process of claim 11, wherein the first step IIa) and the second step IIb) are successive, the first gap is larger than the second gap, and a ratio between the first gap and the second gap is at least 5:1.

14. The process of claim 1, wherein at least one of the following is satisfied:
the first step IIa) and the second step IIb) are successive;
the first distance $Y^1_m$ is larger than the second distance $Y^2_m$; or
a ratio between the first distance $Y^1_m$ and the second distance $Y^2_m$ is at least 10:1.

15. The of claim 1, wherein the first distance $Y^1_m$ is 19 mm or less, and/or 5 mm or more and/or wherein the second distance $Y^2_m$ is 1 mm or less and/or 0.1 mm or more.

16. The process of claim 1, wherein the mold matrix comprises carbon and/or ceramic.

17. The process of claim 1, wherein the distance $Y_m$ between the mold matrix and the first clamping chuck is decreased stepwise while the mold matrix contacts material of the glass tube.

18. A process for the preparation of a glass container from a glass tube in a glass processing machine, the glass tube comprising a first portion with a first end, a second portion with a second end, and a longitudinal axis ($L_{tube}$) that passes through a center of the first end and the second end, the glass processing machine comprising a plurality of processing stations, a first clamping chuck and a second clamping chuck which are adapted and arranged to hold the glass tube while rotating the glass tube around its longitudinal axis $L_{tube}$ and to transport the rotating glass tube from one glass container processing station to the next one, a heating device, and a mold matrix, the process comprising the steps of J) heating the glass tube at a defined position between the first portion and the second portion to a temperature above a glass transition temperature of the glass tube while the glass tube is rotating around its longitudinal axis $L_{tube}$ and pulling apart the first portion and the second portion thereby separating the first portion from the second portion and forming a closed bottom at one end of the first portion; and II) moving the mold matrix towards the closed bottom and bringing the mold matrix into contact with the closed bottom, wherein, while bringing the mold matrix into contact with the closed bottom, a distance $Y_m$ between the mold matrix and the first clamping chuck is decreased stepwise, wherein the distance $Y_m$ between the mold matrix and the first clamping chuck in process step II) is decreased in a first step IIa) and a second step IIb), wherein the mold matrix is in contact with 50% or more and/or 90% or less of a surface area of the closed bottom during the first step IIa) and/or wherein the mold matrix is in contact with 65% or more and/or 100% or less of the surface area of the closed bottom during the second step IIb).

19. The process of claim 18, wherein the distance $Y_m$ between the mold matrix and the first clamping chuck is decreased stepwise while the mold matrix contacts material of the glass tube.

* * * * *